Jan. 11, 1927.
F. O. FARWELL
1,614,355
PLANT TREATING DEVICE
Filed August 12, 1925    3 Sheets-Sheet 1
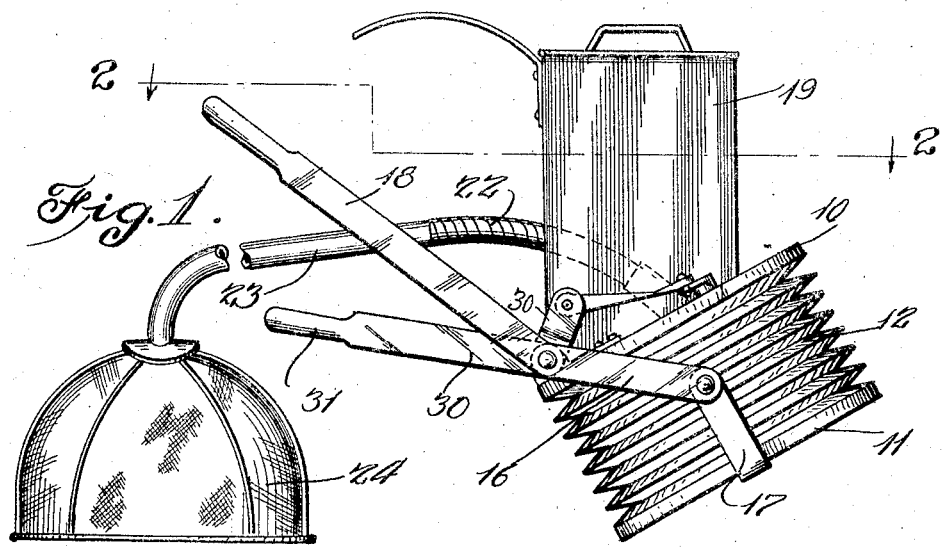
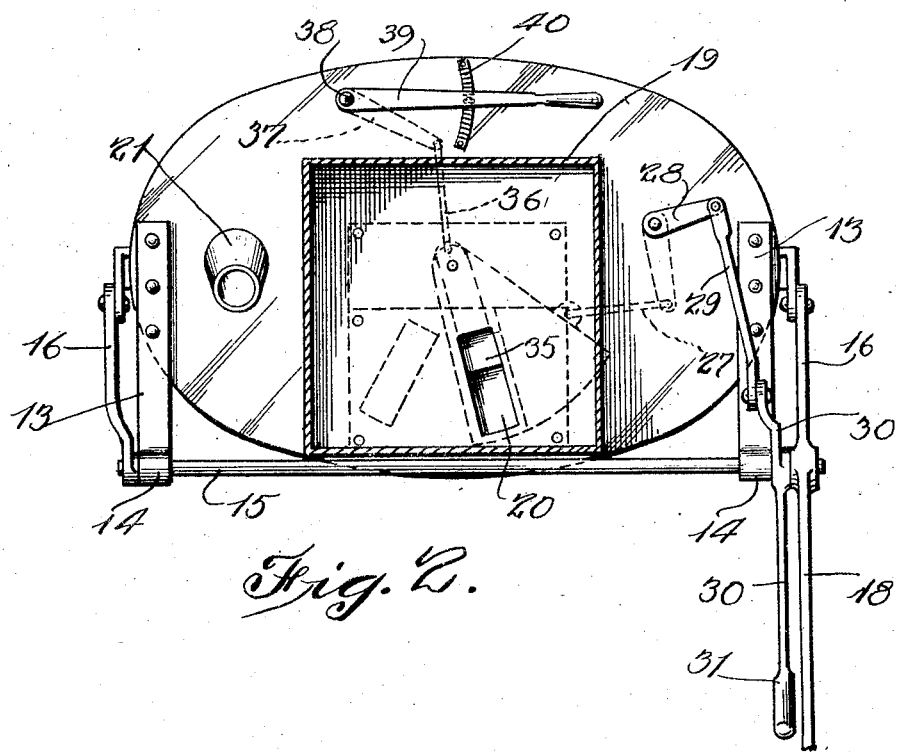
INVENTOR.
F. O. Farwell.
BY Owen Owen & Crampton
ATTORNEYS.

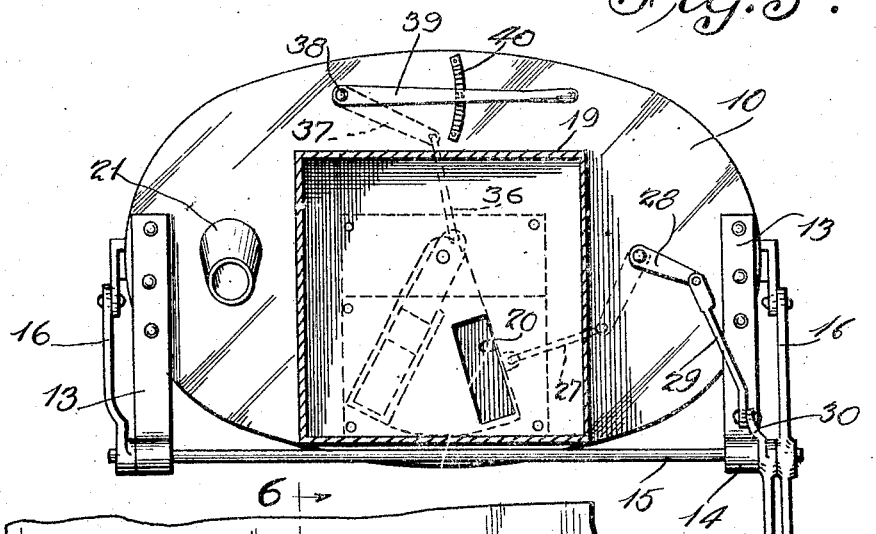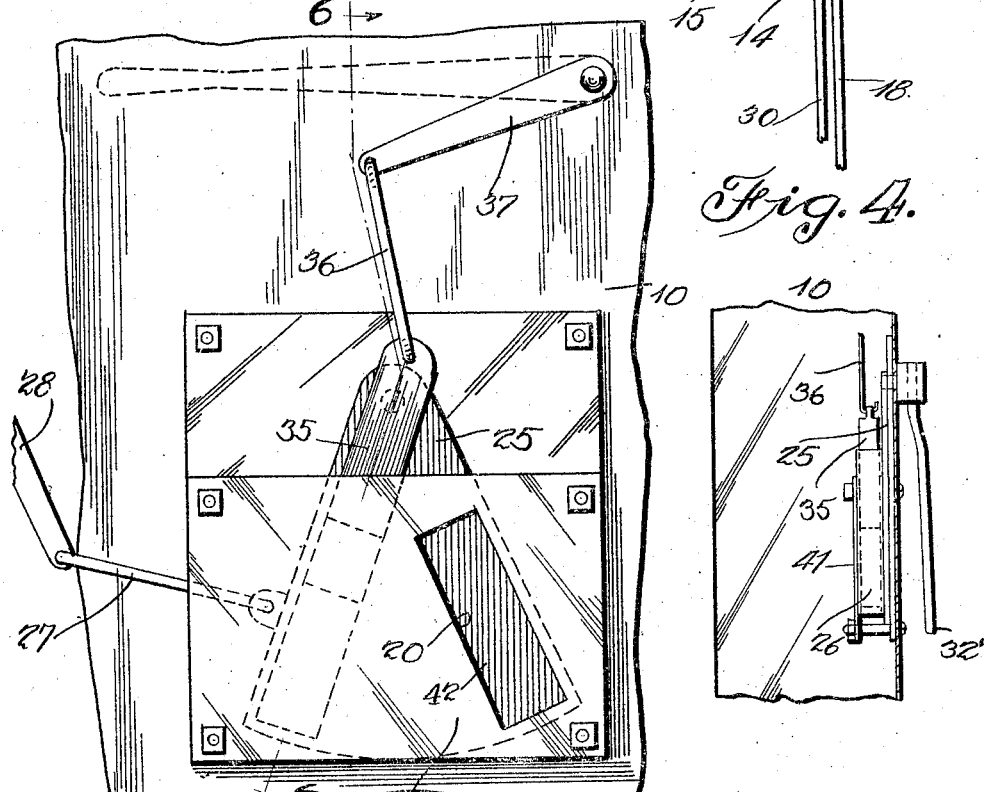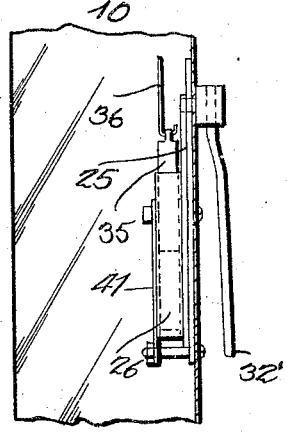

Jan. 11, 1927.

F. O. FARWELL 1,614,355

PLANT TREATING DEVICE

Filed August 12, 1925   3 Sheets-Sheet 3

INVENTOR.
F. O. Farwell.
BY Owen Owen & Crampton
ATTORNEYS.

Patented Jan. 11, 1927.

1,614,355

UNITED STATES PATENT OFFICE.

FAY O. FARWELL, OF TOLEDO, OHIO.

PLANT-TREATING DEVICE.

Application filed August 12, 1925. Serial No. 49,780.

This invention relates to plant treating devices and has special reference to a gas applying apparatus for killing injurious insects on plants.

It is well known that many plants suffer severely from the attacks of insect pests and that many of these attack especially the young tender bud leaves of such plants, this being especially true of citrus trees such as the orange and the like. Also such pests are apt to attack young plants and even older plants like the cotton which is prone to be infested, just before maturity, by the well known boll weavil. In fact almost all farm and florists plants are subject to insect attacks.

Apparatus of various kinds has been used for applying a suitable insecticide to infected plants, the apparatus ranging from a simple watering can to outfits for enclosing an entire tree in a tent or hood and forcing an insecticidal gas beneath such tent or hood or for blowing dust beneath the same.

The present device relates particularly to apparatus of this latter general type being adapted to force a gas or dust beneath a suitable hood which may either be large enough to cover an entire plant or tree or may be of suitable size and shape to cover merely a part of such plant tree.

One object of the invention is to provide a novel and improved general construction of devices of this character.

Among the most valuable substances used for such purposes is calcium-cyanide, a fine powder which quickly volatilizes and produces a gas, very poisonous to all insect life, when exposed to air. Care must be taken, however, in the use of this substance because, if too great a quantity is used in the mixture of the gas and air under the hood, the plant (and especially the young and tender parts) will be burnt and injured while too weak a mixture will fail to kill the insects.

Moreover, even where other insecticides such as lime-nicotine, tobacco dust or other substances in which excess does not injure the plant, are used too great a mixture of the substance with the air under the hood performs no useful function but merely produces waste and is uneconomical.

Another important object of the present invention is therefore, to provide an improved apparatus of this class wherein the powder, whether inert or gas producing, will be used in measured quantities; the amount used being capable of close regulation.

Apparatus has been devised wherein a continuous stream or a series of jets of insecticide and air mixture is forced into the hood. Such devices are wasteful because whatever amount of insecticide is forced in a corresponding amount will be forced out around the edges of the tent or hood.

A third object of the invention is to provide an improved device of this kind wherein such waste will be largely eliminated.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of an apparatus constructed in accordance with this invention.

Figure 2 is an enlarged section on the line 2—2 of Figure 1.

Figure 3 is a similar view showing another position of the valve.

Figure 4 is a detail section on the line 4—4 of Figure 3.

Figure 5 is an enlarged detail view of a portion of the top bellows plate and the parts associated therewith.

Figure 6:
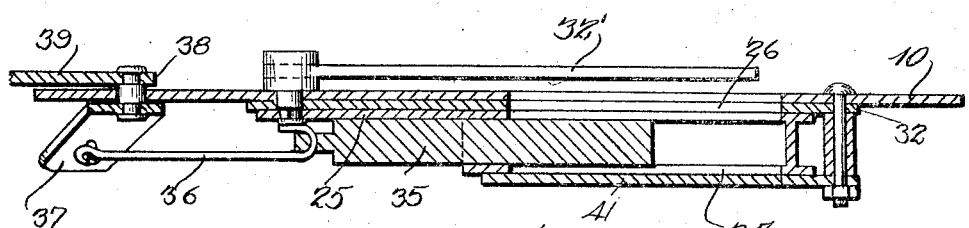
Figure 6 is a section on the line 6—6 of Figure 5.
Figure 7:
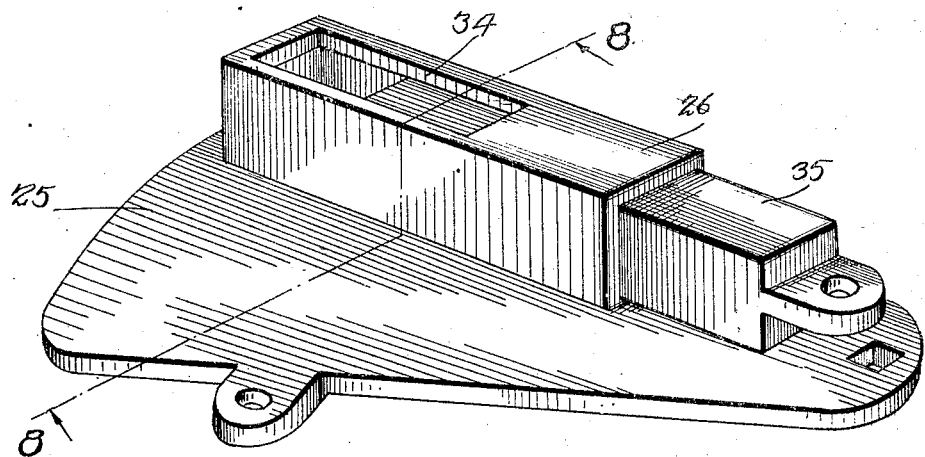
Figure 7 is a detail perspective of the valve plate and regulating plug.
Figure 8:
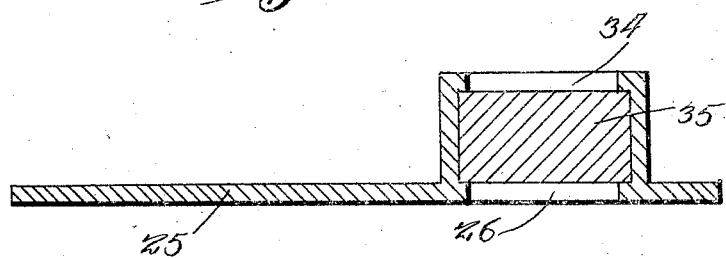
Figure 8 is a section on the line 8—8 of Figure 7.

While this apparatus is capable of many modifications I here show a preferred embodiment wherein there is provided a bellows having a top plate 10 and bottom plate 11, the two being connected by a flexible member 12. The plates are of oval form and at each end of the top plate there is provided a bracket 13 having a bearing 14 at its forward end. Through these bearings runs a rock shaft 15 carrying on its ends the rock levers 16 which are connected to the bottom plate 11 by links 17. One of the rock arms is extended forwardly to form an operating lever 18. On the top plate is mounted a container or reservoir 19 for the storage of powdered insecticide and the top plate is provided with a rectangular slot 20 affording communication between the reservoir and bellows. Also the top plate is provided with a suitable nipple 21 for the connection of a flexible pipe 22 terminating in a stiff tube 23 which may, if desired, carry a hood 24 or, under other circumstances, may simply be inserted in an opening in such hood.

Pivoted to the under side of the top plate is a segment 25 having a slot 26 therein movable into and out of registry with the slot 20 and, to effect such movement, the segment is connected by a link 27 with a bell crank 28 journalled in the top plate and, in turn, connected by a link 29 to one arm of a bent lever 30 journalled on the shaft 15, the remaining arm of said lever being provided with an operating handle 31. A wear plate 32 may be interposed between the segment and top plate 10 if desired, the wear plate of course having an opening corresponding with the opening 20. A breaker arm 32' may also be provided for agitating the powder in the bottom of the reservoir so as to cause it to flow freely through the ports.

On the under side of the segment is a rectangular casing 33 which lies beneath the opening 26 at its forward end and has an opening 34 just below the opening 26. Slidable in the casing is a plug or plunger 35 which is connected by a link 36 with a lever 37 carried by a shaft 38 journalled in the top plate 10. This shaft has on its upper end an adjusting lever 39 traversing a toothed quadrant 40. By this means the capacity of the casing is regulated.

Below the segment and fitting closely against the casing is a plate 41 which has an opening 42 wherewith the opening 34 may be brought to register, the opening 26 being at the same time moved entirely out of registry with the opening 20.

In using the apparatus the reservoir is loaded with the powder and the device hung on the user's shoulders by hooks 43, the levers thus projecting forwardly beneath the left arm leaving the flexible pipe and tubular extension on the right. Before this is done, however, the capacity of the casing, which forms a measuring device for the powder charges, is adjusted. The operator now adjusts the tube and hood to the plant and works the short lever one or more times to introduce the requisite amount of powder into the bellows. He then operates the bellows with the long lever and this alternately forces air and dust or gas into the hood and withdraws at least a portion thereof from the hood thus keeping the air and insecticide under the hood constantly agitated. From time to time, as may be necessary, he drops one or more fresh charges into the bellows to keep the mixture up to killing strength.

It must be noted that the added insecticide is kept to such quantity as to keep the mixture with the air just up to killing strength but not to burning strength.

Another method of using the apparatus on small vegetation or new growth is to so adjust the capacity of the charge carrier that one stroke of the charging lever is just sufficient to properly supply a killing strength to the bellows contents and in this case both levers may be operated at the same time.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an apparatus of the class described, a powder reservoir for containing a gas producing powder, a bellows associated with said reservoir, an oscillating charge carrier movable between said reservoir and bellows and adapted to receive a charge of powder from the reservoir at one extremity of its movement and to deliver such charge to the bellows at the other extremity of its movement, means to oscillate said carrier, and means to vary at will the capacity of the charge carrier.

2. In combination, an insecticide container, a valveless bellows communicating with the container, a hood to cover a portion at least of an infected plant, and a tube connecting the bellows and hood whereby the contents of the bellows is conveyed to the hood and a portion of the contents is drawn backwards into the bellows upon opening thereof and a sufficient amount of insecticide is added to keep the contents of the hood to killing strength.

3. In an apparatus of the class described, a reservoir for insecticidal dust having a port in its bottom, a bellows attached to said reservoir and communicating therewith through said port, a valve controlling the passage of dust from said reservoir to said bellows, an outlet from said bellows, said bellows being sealed against all other openings, and a plant covering hood having free communication with said bellows.

4. In an apparatus of the class described, a reservoir for insecticidal dust having a port in its bottom, a bellows attached to said reservoir and communicating therewith through said port, an adjustably ported valve controlling the passage of dust from said reservoir to said bellows, means to adjust the capacity of the port in said valve, an outlet from said bellows, said bellows being sealed against all other openings, and a plant covering hood having free communication with said bellows.

5. In an apparatus of the class described, a reservoir for insecticidal dust having a port in its bottom, a bellows attached to said reservoir and communicating therewith through said port, an oscillating member having a port therein adapted to be swung into and out of register with the first mentioned port, means to swing said oscillating member, and means to control the port opening in said oscillating member.

6. In an apparatus of the class described, a reservoir for insecticidal dust having a port in its bottom, a bellows attached to said reservoir and communicating therewith through said port, the top of the bellows forming the bottom of the reservoir, a plate supported in spaced relation below said bellows top and having a port therein in staggered relation to the first mentioned port, a powder carrier fitting between the plates and having openings in its top and bottom and movable to selective registration with said port, and means to operate said powder carrier.

7. In an apparatus of the class described, a reservoir for insecticidal dust having a port in its bottom, a bellows attached to said reservoir and communicating therewith through said port, the top of the bellows forming the bottom of the reservoir, a plate supported in spaced relation below said bellows top and having a port therein in staggered relation to the first mentioned port, a powder carrier fitting between the plates and having openings in its top and bottom and movable to selective registration with said port, means to operate said powder carrier, and means to regulate the capacity of said powder carrier.

8. In an apparatus of the class described, a reservoir for insecticidal dust having a port in its bottom, a bellows attached to said reservoir and communicating therewith through said port, the top of the bellows forming the bottom of the reservoir, a plate supported in spaced relation below said bellows top and having a port therein in staggered relation to the first mentioned port, an oscillating member pivoted to move between said plates and including a powder carrier having ports in its top and bottom arranged for selective registration with the ports in the bellows top and the plate, and means to oscillate the powder carrier.

9. In an apparatus of the class described, a reservoir for insecticidal dust having a port in its bottom, a bellows attached to said reservoir and communicating therewith through said port, the top of the bellows forming the bottom of the reservoir, a plate supported in spaced relation below said bellows top and having a port therein in staggered relation to the first mentioned port, an oscillating member pivoted to move between said plates and including a powder carrier having ports in its top and bottom arranged for selective registration with the ports in the bellows top and the plate, means to oscillate the powder carrier, and means to regulate the capacity of said powder carrier.

10. In an apparatus of the class described, a reservoir for insecticidal dust having a port in its bottom, a bellows attached to said reservoir and communicating therewith through said port, the top of the bellows forming the bottom of the reservoir, a plate supported in spaced relation below said bellows top and having a port therein in staggered relation to the first mentioned port, an oscillating member pivoted to move between said plates and including a powder carrier having ports in its top and bottom arranged for selective registration with the ports in the bellows top and the plate, means to oscillate the powder carrier, a plunger movable longitudinally in the powder carrier to adjust the effective length thereof, and means to adjustably position the plunger in the powder carrier.

In testimony whereof I affix my signature.

FAY O. FARWELL.